May 24, 1927.  
H. J. GILBERT  
1,629,498  
HUB FOR SPLIT PULLEYS AND THE LIKE  
Filed July 21, 1924    2 Sheets-Sheet 2

Henry J. Gilbert, Inventor

By George B. Willcox, Attorney

Patented May 24, 1927.

1,629,498

UNITED STATES PATENT OFFICE.

HENRY J. GILBERT, OF SAGINAW, MICHIGAN, ASSIGNOR TO SAGINAW MANUFACTURING CO., OF SAGINAW, MICHIGAN, A CORPORATION OF MICHIGAN.

HUB FOR SPLIT PULLEYS AND THE LIKE.

Application filed July 21, 1924. Serial No. 727,284.

This invention pertains to an improved hub construction for split belt pulleys.

My improvement provides a novel construction of the hub to secure lightness and compactness, with unusual shaft-gripping strength, and a new arrangement of the bolts by which the hub members are clamped together upon the shaft.

An object of my invention is to secure greater shaft-gripping power with a smaller diameter hub, thereby saving weight, material and cost. For that purpose I clamp the hub by a larger number of bolts of smaller diameter than heretofore and arrange them so that it is possible to locate the bolts very close to the shaft. Consequently I am enabled to employ a very light hub construction and yet secure an unusually tight grip on the shaft.

Heretofore hub bolts have usually been arranged side by side, the nuts or heads also being side by side in the same plane.

The bolts were formerly spaced quite far apart in order that each nut could be turned without the wrench being interfered with by the nut or head of an adjacent bolt. When spaced far apart the bolts required the hub of the pulley to be correspondingly long, but long hubs are objectionable because they project beyond the edge planes of the pulley rim, making the hub length greater than the width of face.

In my improved construction I arrange the bolts very close together, yet all bolts are accessible, for I so construct the hub that adjacent bolts are offset lengthwise. Neither the head nor the nut of one bolt is in the plane of the nut or head of the adjacent bolt although the operative parts of the bolts be all of the same length. Consequently the wide spacing of the bolts above referred to is no longer necessary in order to provide clearance for the wrench. Moreover, the wrench may be operated from either side of the pulley and all of the bolts can be readily tightened even though one side of the pulley is located close to a wall, to another pulley, or to a shaft bearing or other construction, whereas such a location of the pulley has heretofore usually resulted in the bolts on one side being left untightened on account of the difficulty of reaching them with a wrench. Thus, the boss of each hub member is arranged in alternate relation to the boss of the opposite hub member and the bolt-receiving passages through the hub members and of substantially equal length, permitting the employment of bolts all of the same operative length, yet with their heads and nuts offset, as shown.

With the foregoing and certain other objects in view which will appear later in the specifications, my invention comprises the devices described and claimed and the equivalents thereof.

In the drawings, Fig. 1 is a side view broken away and partly in section showing a pulley embodying my construction, the section being on line 1—1 of Fig. 2.

Figure 1:
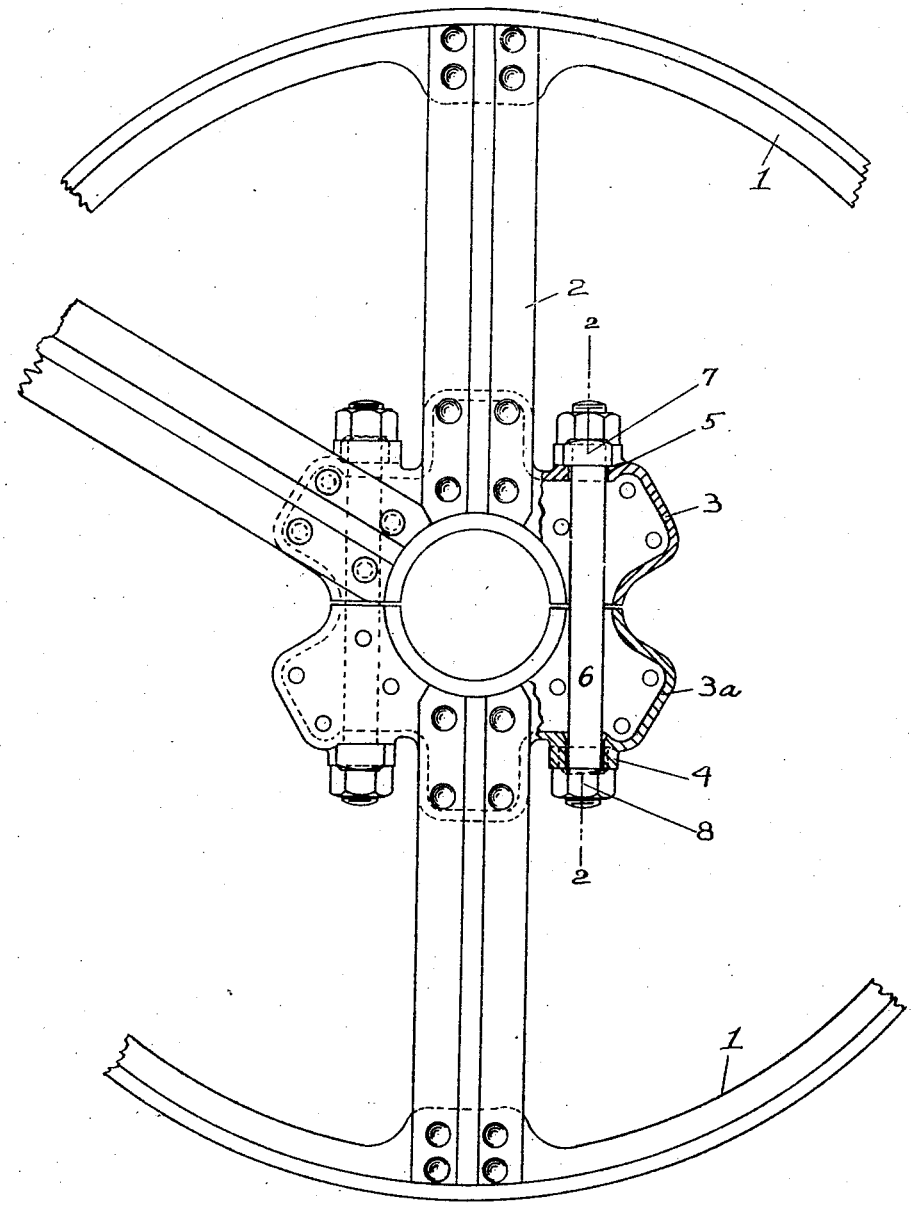

As is clearly shown in the drawings, 1 represents the pulley rim, 2 the spokes and 3 and 3ª the respective halves of the split hub. The hub is preferably hollow and made of malleable iron, sheet steel or other suitable material.

Figure 2:
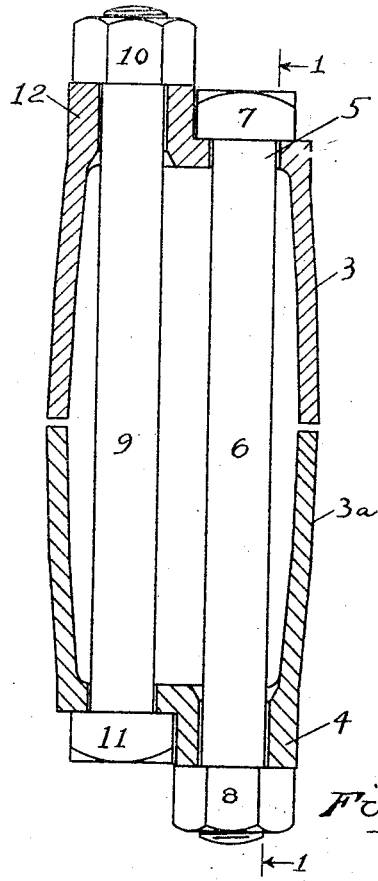
Fig. 2 is an enlarged section on line 2—2 of Fig. 1.
Figure 3:
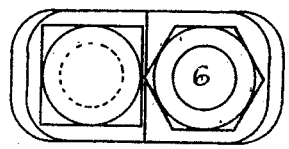
Fig. 3 is an end view of the parts shown in Fig. 2.
Figure 5:
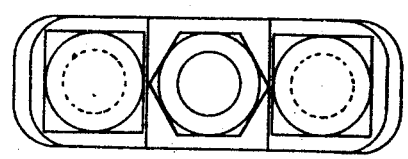
Fig. 5 is an end view of the parts shown in Fig. 4.

In the forms shown in Figs. 1, 2, 3, four clamping bolts are used as has heretofore been customary, two at each side of the shaft, as is customary for pulleys of medium size.

4 is an apertured boss formed on the hub member and 5 is a corresponding aperture in the opposite hub member. Bolt 6 passes through both members, its head 7 taking against the outer face of one member as 3, Fig. 2, and its nut against the face of the raised boss 4 on the opposite hub member.

The adjacent bolt 9 has its nut 10 seated upon a similar raised boss 12 and its head 11 upon the face of the opposite hub member 3ª.

Figure 4:
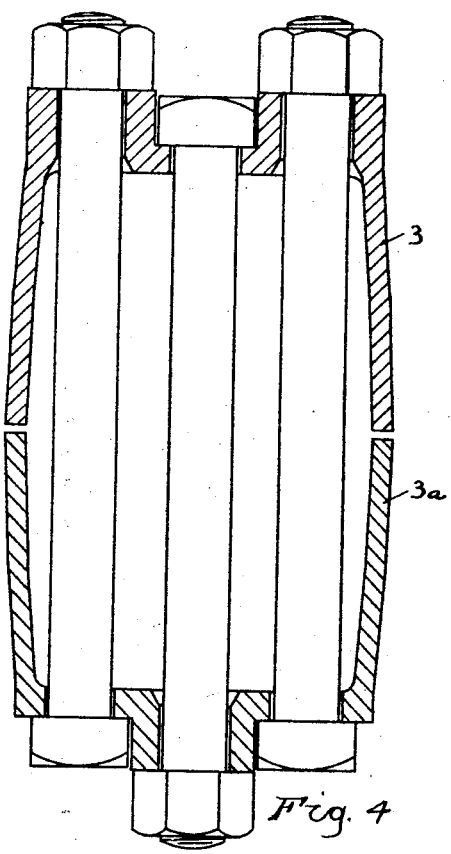
Fig. 4 is a section similar to Fig. 2, but showing a modified form of hub clamped by three bolts.

In Fig. 4, which is shown as having three bolts, each hub member is provided with raised bosses to seat the nuts of alternate bolts.

Bolt heads 11 and 7 are kept from turning by the respective adjacent bosses 4 and 12. The thickness of the raised bosses 4 and 12 is such that the nuts 8 and 10 can be turned by an ordinary wrench without interfering with the head of the adjacent bolt.

Both nuts 8 and 10 can be conveniently tightened or loosened from either the right-hand side or the left-hand side of the pulley. They are both accessible, even if one side of the pulley is placed close to a post or wall, a location which as previously noted, heretofore has made it extremely difficult to secure proper tightening of all the clamping bolts.

The bolts 6 and 9 with this arrangement can be placed very close together, and as illustrated in Fig. 4, three or more such bolts can be located close together without interfering with the manipulation of the wrench, yet requiring only a minimum length of hub.

When large diameter bolts and nuts are used the hub must be made wider to permit the use of a larger wrench and the weight, also the cost of the pulley are increased. An advantage of my construction is that heavy duty pulleys can be made with smaller hubs, clamped by a larger number of smaller bolts. I also thereby distribute the strain on the pulley hub more evenly.

Having thus described my invention, what I claim and desire to secure by Letters Patent is:

1. A pulley comprising a pair of hub members, said members having alined openings therein to provide parallel bolt passages disposed substantially at right angles to the axis of the hub, a raised boss at one end only of each passage, said bosses arranged alternately upon said hub members, and bolts passing through said passages.

2. A pulley comprising a pair of hub members, said members having alined openings therein to provide parallel bolt passages of uniform length and disposed substantially at right angles to the axis of the hub, a raised boss at one end only of each passage, said bosses arranged alternately upon said hub members, and bolts passing through said passages.

3. A hub comprising a pair of sections, outwardly extending bosses on each section, said sections having parallel openings to provide bolt passageways therein, each opening extending through one boss only, said sections assembled with the bolt passageways of one section alined with the passageways of the other, whereby to provide bosses on said sections in staggered relation to each other, and bolts passing through said passageways.

In testimony whereof, I affix my signature.

HENRY J. GILBERT.